_(12)_ United States Patent
Flamand et al.

(10) Patent No.: US 11,276,329 B2
(45) Date of Patent: *Mar. 15, 2022

(54) ARTIFICIAL EYE SYSTEM COMPRISING A SEE-THROUGH DISPLAY

(71) Applicant: CAE HEALTHCARE CANADA INC., Saint-Laurent (CA)

(72) Inventors: Jean-Sebastien Flamand, Saint-Laurent (CA); Francois Caron, Saint-Laurent (CA)

(73) Assignee: CAE HEALTHCARE CANADA INC., Saint-Laurent (CA)

( * ) Notice: Subject to any disclaimer, the term of this patent is extended or adjusted under 35 U.S.C. 154(b) by 353 days.

This patent is subject to a terminal disclaimer.

(21) Appl. No.: 15/475,481

(22) Filed: Mar. 31, 2017

(65) Prior Publication Data

US 2018/0286284 A1 Oct. 4, 2018

(51) Int. Cl.
*G09B 23/32* (2006.01)

(52) U.S. Cl.
CPC .................... *G09B 23/32* (2013.01)

(58) Field of Classification Search
CPC ...... G09B 23/32; G09B 2320/10; G09B 9/00; G09B 9/28; G09B 9/285; G09B 9/32; G09G 3/3413; G09G 2360/142; G09G 2380/08; B25J 11/001; B25J 11/0015; A63H 3/38; A63H 3/40

USPC ....... 434/272, 274, 267, 268, 262, 270, 271, 434/269

See application file for complete search history.

(56) References Cited

U.S. PATENT DOCUMENTS

| | | | | |
|---|---|---|---|---|
| 5,900,923 A | * | 5/1999 | Prendergast | G09B 23/28 351/211 |
| 6,391,057 B1 | * | 5/2002 | Schleipman | A61F 2/141 446/389 |
| 8,562,133 B2 | | 10/2013 | Schmid et al. | |
| 2007/0002130 A1 | * | 1/2007 | Hartkop | H04N 7/141 348/14.16 |
| 2010/0145669 A1 | * | 6/2010 | Norden | F41G 1/54 703/7 |
| 2014/0038153 A1 | * | 2/2014 | Courtoy | G09B 23/28 434/271 |
| 2015/0279238 A1 | | 10/2015 | Forte et al. | |
| 2016/0267806 A1 | * | 9/2016 | Hsu | G09B 19/24 |
| 2018/0144663 A1 | * | 5/2018 | Kirchoff | G09B 23/30 |

* cited by examiner

*Primary Examiner* — Timothy A Musselman
(74) *Attorney, Agent, or Firm* — Fasken Martineau Dumoulin LLP; Serge LaPointe

(57) ABSTRACT

There is described an artificial eye system comprising: a see-through display for displaying an image of an eye thereon; a light detector for detecting light propagating through the see-through display and coming from an external environment; and a controller for: generating the image of the eye using information about the light detected by the light detector; and displaying the generated image of the eye on the see-through display.

20 Claims, 5 Drawing Sheets

ARTIFICIAL EYE SYSTEM COMPRISING A SEE-THROUGH DISPLAY

TECHNICAL FIELD

The present invention relates to the field of artificial eyes, and more particularly to artificial eyes for artificial bodies such as patient simulators, mannequins or robots.

BACKGROUND

Artificial bodies such as patient simulators, mannequins or robots are used for different purposes including training. For example, patient simulators are used for training physicians. In this case, patient simulators are developed so as to mimic human behaviors, simulate diseases, etc. in order to allow interaction between the patient simulator and the physician.

For example, patient simulators are usually provided with artificial eyes in order to train physicians on eye diseases. Some artificial eyes are mechanical eyes which may be articulated. For example, the diameter of a motorized pupil or a motorized iris of some mechanical eyes may change according to the intensity of ambient light or following the illumination of the eye by a light beam. However, at least some of the mechanical eyes do not offer flexibility since their appearance cannot be changed in addition to being noisy. Therefore, the appearance of such a mechanical eye cannot be changed to simulate different diseases or even change the color of the iris. In order to overcome this issue, displays have been used to simulate eyes. An artificial body is then provided two displays on which an image of eye is displayed. Such a technic allows modifying the appearance of the displayed eyes to simulate different diseases for example.

Some of the artificial eyes that comprise a display to display images of an eye also comprise a light sensor for modifying the appearance of the displayed eyes according to the detected light. For example, the diameter of the pupil may vary according to the light detected by the light sensor. However, the light sensor is located away from the display which may create unrealistic situations. For example, if a physician in training propagates a light beam towards the pupil of a displayed eye, the light sensor may not detect the light since it is positioned away to the display. Therefore, the appearance of the pupil will not change since no light is detected by the light sensor, which represents a non-realistic scenario.

Some other artificial eyes comprising a display to display images of an eye also comprise a light sensor positioned behind the display which is provided with a hole extending therethrough and having a fixed position on the display to allow ambient light propagating through the hole up to the light sensor. Such artificial eyes control the image of the eye being displayed according to the intensity of the light detected by the light sensor. However, such artificial eyes are limited Therefore, there a need for an improved artificial eye system.

SUMMARY

In accordance with a first broad aspect, there is provided an artificial eye system comprising: a see-through display for displaying an image of an eye thereon; a light detector for detecting light propagating through the see-through display and coming from an external environment; and a controller for: generating the image of the eye using information about the light detected by the light detector; and displaying the generated image of the eye on the see-through display.

In one embodiment, the controller is adapted to determine the image of the eye to be displayed as a function of a patient profile, the patient profile comprising at least one of an age, an eye color, a weight, a heart rate, an ethnicity and a medical condition.

In one embodiment, the light detector comprises at least one photodetector each adapted to measure an intensity of light incident thereon.

In one embodiment, the light detector comprises a camera for imaging a scene contained in the external environment and seen through the see-through display.

In one embodiment, the controller is adapted to generate the image of the as a function of an intensity of the detected light.

In one embodiment, the intensity comprises one of a peak intensity, a total intensity and an average intensity.

In another embodiment, the intensity comprises a pattern of detected light.

In one embodiment, the detected light comprises at least one image of the scene acquired by the camera.

In one embodiment, the controller is adapted to determine the image of the eye as a function of an intensity variation of the detected light.

In one embodiment, the intensity variation comprises one of a peak intensity variation, a total intensity variation and an average intensity variation.

In another embodiment, the intensity variation comprises a variation of a pattern of detected light.

In one embodiment, the controller is adapted to determine at least one characteristic for at least one element to be contained in the image of the eye as a function of the detected light.

In one embodiment, the at least one characteristic comprises at least one of a shape, a color, a size and a position for at least one element.

In one embodiment, the at least one element comprises at least a sclera and a pupil.

In one embodiment, the at least one element further comprises at least one of an iris, an upper eyelid, a lower eyelid, eyelashes, and a lacrimal caruncle.

According to a second broad aspect, there is provided a method for displaying an eye on a see-through display, the method comprising: detecting light propagating through the see-through display and coming from an external environment; generating an image of the eye using information about the light detected by the light detector; and displaying the generated image of the eye on the see-through display.

In one embodiment, the step of determining the image of the eye to be displayed is further performed as a function of a patient profile, the patient profile comprising at least one of an age, an eye color, a weight, a heart rate, an ethnicity and a medical condition.

In one embodiment, said determining the image of the eye to be displayed is performed as a function of an intensity of the detected light.

In one embodiment, the intensity comprises one of a peak intensity, a total intensity and an average intensity.

In another embodiment, the intensity comprises a pattern of detected light.

In one embodiment, said detecting the light propagating through the see-through display comprises acquiring an image of a scene contained in the external environment and seen through the see-through display.

In one embodiment, said generating the image of the eye is performed as a function of an intensity variation of the detected light.

In one embodiment, the intensity variation comprises one of a peak intensity variation, a total intensity variation and an average intensity variation.

In another embodiment, the intensity variation comprises a variation of a pattern of detected light.

In one embodiment, said generating the image comprises determining at least one characteristic for at least one element to be contained in the image of the eye as a function of the detected light.

In one embodiment, the at least one characteristic comprises at least one of a shape, a color, a size and a position for at least one element.

In one embodiment, the at least one element comprises at least a sclera and a pupil.

In one embodiment, the at least one element further comprises at least one of an iris, an upper eyelid, a lower eyelid, eyelashes, and a lacrimal caruncle.

According to another broad aspect, there is provided a system for controlling an artificial body, the system comprising: a see-through display for displaying an image of an eye thereon; a light detector for detecting light propagating through the see-through display and coming from an external environment; and a controller for: determining a reaction for the artificial body using information about the light detected by the light detector; and outputting the determined reaction.

In one embodiment, the controller is adapted to determine the reaction as a function of a patient profile, the patient profile comprising at least one of an age, an eye color, a weight, a heart rate, an ethnicity and a medical condition.

In one embodiment, the light detector comprises at least one photodetector each adapted to measure an intensity of light incident thereon.

In another embodiment, the light detector comprises a camera for imaging a scene contained in the external environment and seen through the see-through display.

In one embodiment, the controller is adapted to determine the reaction as a function of an intensity of the detected light.

In one embodiment, the intensity comprises one of a peak intensity, a total intensity and an average intensity.

In another embodiment, the intensity comprises a pattern of detected light.

In one embodiment, the detected light comprises at least one image of the scene acquired by the camera.

In one embodiment, the controller is adapted to determine the reaction as a function of an intensity variation of the detected light.

In one embodiment, the intensity variation comprises one of a peak intensity variation, a total intensity variation and an average intensity variation.

In another embodiment, the intensity variation comprises a variation of a pattern of detected light.

In one embodiment, the determined reaction comprises a movement for a body part of the artificial body.

In one embodiment, the controller is adapted to determine at least one of a type of movement and a movement amplitude.

In one embodiment, the determined reaction comprises a sound to be emitted.

In one embodiment, the determined reaction comprises determining a physiological reaction.

According to a further broad aspect, there is provided a method for controlling an artificial body using an artificial eye system, the artificial eye system comprising at least a see-through display and a light detector, the method comprising: detecting light propagating through the see-through display and coming from an external environment; determining a reaction for the artificial body using information about the light detected by the light detector; and outputting the determined reaction.

In one embodiment, the step of determining the reaction is further performed as a function of a patient profile, the patient profile comprising at least one of an age, an eye color, a weight, a heart rate, an ethnicity and a medical condition.

In one embodiment, said determining the reaction is performed as a function of an intensity of the detected light.

In one embodiment, the intensity comprises one of a peak intensity, a total intensity and an average intensity.

In another embodiment, the intensity comprises a pattern of detected light.

In one embodiment, said detecting the light propagating through the see-through display comprises acquiring an image of a scene contained in the external environment and seen through the see-through display.

In one embodiment, said determining the reaction is performed as a function of an intensity variation of the detected light.

In one embodiment, the intensity variation comprises one of a peak intensity variation, a total intensity variation and an average intensity variation.

In another embodiment, the intensity variation comprises a variation of a pattern of detected light.

In one embodiment, said determining the reaction comprises determining a movement for the articulated body part.

In one embodiment, said determining the movement comprises determining at least one of a type of movement and a movement amplitude.

In one embodiment, said determining the reaction comprises determining a sound to be emitted.

In one embodiment, said determining the reaction comprises determining a physiological reaction.

According to still another broad aspect, there is provided an artificial body comprising: at least a head; and the artificial eye system described above, the artificial eye system being embedded into the head.

In one embodiment, the artificial body further comprises at least one of a torso, at least one arm, at least one hand, at least one leg, and at least one foot.

It should be understood that a see-through display may be any adequate display unit on which an image may be displayed and which, when light is incident thereon, allows at least a portion of the incident light to propagate therethrough from one side to another. In one embodiment, a see-through display may be transparent or semi-transparent to light having a predefined wavelength or a predefined range of wavelength while preventing light having another wavelength or another range of wavelength. For example, a see-through display may be transparent or semi-transparent to visible light while being substantially opaque to non-visible light. In another embodiment, a see-though display may be transparent or semi-transparent to light having any wavelength. For example, a see-through display may be transparent or semi-transparent to both visible light and non-visible light.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
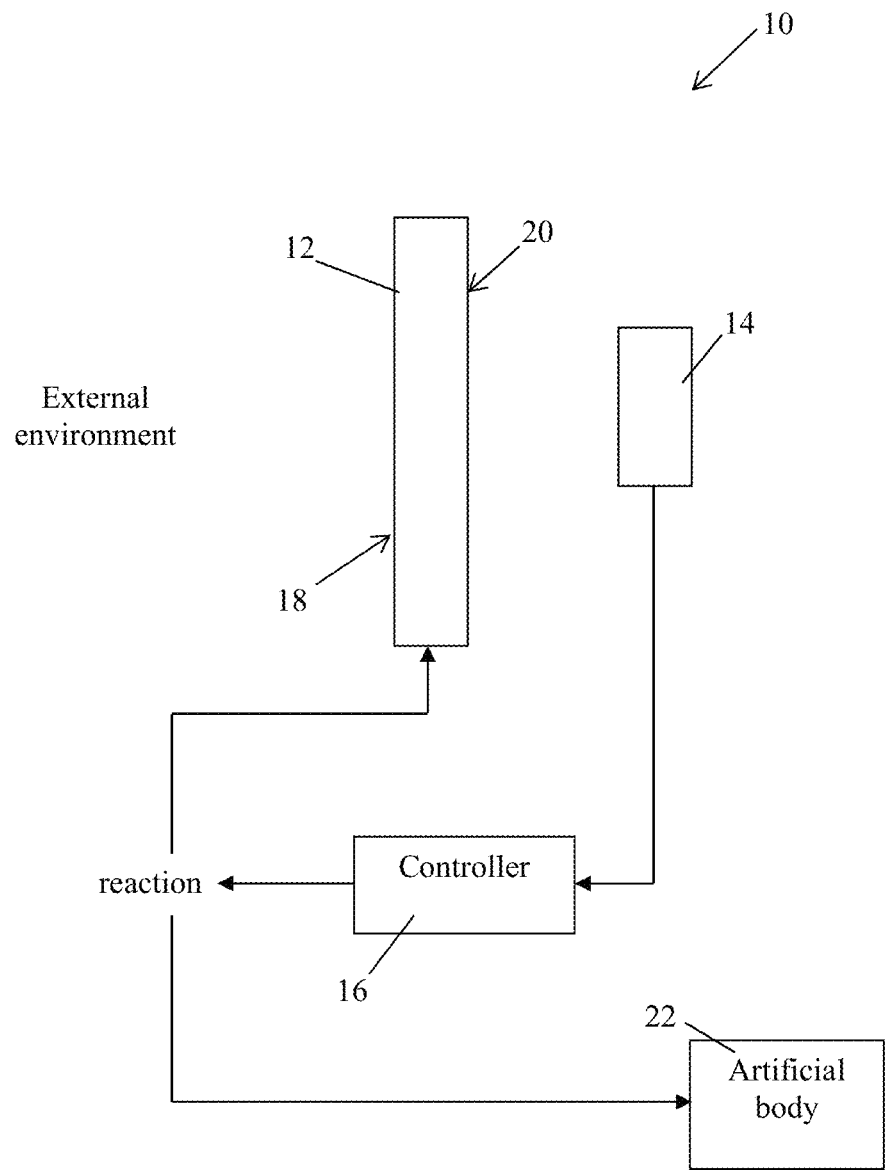
FIG. 1 is a block diagram illustrating an artificial eye system adapted to determine a reaction for an artificial body, in accordance with an embodiment.

In the following there is described an artificial eye system which may be used to cause a reaction for an artificial body such as a patient simulator, mannequin, a robot, a toy or the like. A patient simulator may be adapted to simulate a human being, an animal or the like. There is also described a method for controlling an artificial body using an artificial eye system. The artificial eye system may be embedded into an artificial, such as a patient simulator, body which comprises at least one head. The artificial body may further comprise a torso, at least one arm, at least one hand, at least one leg, and/or at least one foot, and may mimic a human body, an animal body, a robot body, or the like. For example, the artificial body may correspond to a medical simulator. Some parts of the artificial body may be articulated while other parts may be fixed or unarticulated. The artificial body may also comprise a sound reproduction device for emitting sounds or imitating a voice. In another example, the artificial body may comprise a lachrymal gland reproduction system adapted to discharge tears adjacent to the eyes.

The artificial eye system comprises a see-through display, a light detector and a controller for determining a reaction to be performed by the artificial eye system or the artificial body. The see-through display is adapted to display an image of an eye thereon. The light detector is positioned behind the see-through display and detects light coming the external environment. The controller is adapted to display an image of an eye on the see-through display and further adapted to determine a reaction for the artificial eye system and/or the artificial body according to the light detected by the light detector.

It should be understood that a reaction may correspond to a change of configuration or state for the artificial eye system and/or for the artificial body or a component of the artificial body. For example, a reaction may be a motor reaction, a physiological reaction, etc. A reaction may also correspond to a sound or word(s) generated by a sound reproduction device, tears to be discharged by a lachrymal gland reproduction system, etc.

When the detected light causes a change of configuration/state for the artificial eye system, the controller is adapted to determine the image of the eye to be displayed on the see-through display as a function of the detected light. As a result, the controller is adapted to modify the appearance of the eye displayed on the see-through display as a function the light incident on the see-through display. The appearance of the displayed eye may comprise the intensity of the light emitted by the display unit to display the eye, the shape, size and/or color of at least one element of the displayed eye, the position of at least one element of the displayed eye, and/or the like.

When the detected light causes a change of configuration/state for the artificial body, the controller is adapted to determine a new configuration for the artificial body as a function of the light detected or the determined pattern of light. For example, the controller may determine a rotation of the head of the artificial body, a movement of an arm to place the hand in front of the display of the artificial eye system, a sound to be emitted, etc. The new configuration may also correspond to a physiological reaction for the artificial body such spams to simulate an epileptic seizure, the discharge of tears, etc.

When the detected light causes a sound to be emitted by the sound reproduction device, the controller is adapted to determine a sound or words to be emitted by the sound reproduction system as a function of the light detected or a determined pattern of light. For example, the controller may control the sound reproduction system for emitting a sound indicative of a pain, words for interacting with the user, etc.

It should be understood that the image of the eye displayed on the see-through display 12 comprises at least a sclera and a pupil. The characteristics of the sclera and the pupil such as their shape, size, color, and/or the like may vary. For example, an eye may comprise a rectangular black sclera and a square red pupil. In another example, the sclera may have the shape of a human eye and be white while the pupil is circular and black.

In one embodiment, the image of the eye further comprises an iris, an upper eyelid, a lower eyelid, eyelashes, a lacrimal caruncle and/or the like to mimic a human eye. The image of the eye may comprise further elements such as blood, blood vessels, marks and/or the like to mimic a medical condition or disease. The color of the sclera may be changed to yellow for example in order to mimic a disease of the liver.

In the following there are described exemplary embodiments artificial eye systems and methods for controlling an artificial eye system and/or an artificial body.

FIG. 1 illustrates one embodiment of an artificial eye system 10 adapted to determine a reaction for the artificial eye system and/or an artificial body. The artificial eye system 10 comprises a see-through display 12 for displaying an image of an eye thereon, a light detector 14 for detecting light and a controller 16 for determining the reaction. The see-through display 12 comprises a first or front face 18 which faces the environment external to the artificial eye system and on which the image of the eye is displayed so that light emitted by the see-through display 12 propagates towards the external environment. The see-through display 12 further comprises a second or back face 20 which is opposite to the front face 18. The light detector 14 is positioned behind the see-through display 12 relative to the external environment so that it faces the second face 20 of the see-through display 12. The light detector 14 is adapted to detect light coming from the external environment and propagating through the see-through display 12. Information about the detected light is transmitted by the light detector 14 to the controller 16. The controller is adapted to determine a reaction for the artificial eye system and/or the artificial body using the received information about the detected light.

It should be understood that any adequate see-through display adapted to display an image of an eye thereon and to allow light to propagate therethrough may be used. For example, the see-through display 12 may be a liquid-crystal display (LCD), a light-emitting diode (LED) display such as an organic LED (OLED) display, or the like.

In one embodiment, the see-through display 12 is planar. In this case, the artificial eye system 10 may be further provided with a curved lens positioned in front of the front face 18 of the see-through display 12. The curvature of the curved lens may be chosen to substantially correspond to that of a human eye for example. In another embodiment, the see-through display 12 may be curved.

The light detector 14 may have any adequate size and/or position relative to the see-through display 12 so as to detect at least some of the light coming from the external environment and propagating through the see-through display 12. In one embodiment, the light detector 14 has an adequate size and/or position relative to the see-through display 12 so as to detect substantially all of the light coming from the external environment and propagating through the see-through display 12. For example, the light detector 14 may face the see-through display 12, In another embodiment, the light detector 14 may not face the see-through display 12 and mirrors and/or optical waveguides such as optical fibers may be used for collecting the light propagating through the see-through display 12 and direct the collected light towards the light detector 14.

It should be understood that the light detector 14 may be any adequate device adapted to determine at least one characteristic of the light incident thereon. For example, the light detector may be a light sensor adapted to measure the intensity of the light incident thereon. For example, the light detector may be a photodetector adapted to detect visible and/or invisible light. In another example, the light detector may be camera adapted to image at least a portion of the external environment seen through the see-through display 12. For example, a webcam, an infrared camera, a high frequency camera, a reflex camera, or the like may be used. For example, the camera may be provided with a lens or not, and may detect visible and/or invisible light.

When the light detector 14 is a photodetector, the photodetector may have any adequate size and/or position so as to detect at least some of the light coming from the external environment and propagating through the see-through display 12. For example, the photodetector may have a surface area that is substantially equal to that of the see-though display 12 and be positioned adjacent the back face 22 of the see-through display 12. In another example, the surface area of the photodetector may be less than that of the see-through display and the photodetector may be positioned so as to face the center of the see-through display 12.

When the light detector 14 is a camera, the camera may be positioned relative to the see-through display 12 so that at least a portion of the see-through display 12 be within the field of view of the camera. In another embodiment, the camera may be positioned relative to the see-through display 12 so that the whole surface area of the see-through display 12 be located within the field of view of the camera. In one embodiment, the camera is positioned relative to the see-through display 12 so that the central axis of the camera is aligned with the central axis of the see-though display 12.

It should be understood that the artificial eye system 10 may be provided with more than one light detector 14 each positioned behind the see-through display 12. For example, the artificial eye system 10 may comprise a photodetector and a camera. In another example, the artificial eye system 10 may comprise a matrix of photodetectors comprising a plurality of photodetectors organized according to rows and columns. In this case, each photodetector detects the intensity of the light incident thereon and a pattern of light may be subsequently generated by the controller 16. Each point of the pattern has a value of light intensity associated thereto and the light intensity value corresponds to the light intensity detected by the photodetector having the same position of the point within the pattern than the position of the photodetector within the matrix of photodetectors.

Referring back to FIG. 1, the controller 16 is adapted to generate an image of an eye and transmit the generated image to the see-through display 12 to be displayed thereon. In one embodiment, the image of the eye is constant in time so that the controller 16 generates a single image of an eye which is continuously displayed by the see-through display 12. In another embodiment, the image of the eye varies in time. In this case, the controller 16 is adapted to substantially continuously or iteratively generate images of an eye and transmit the generated images to the see-through display 12 to be displayed thereon. In one embodiment, the controller 16 may be adapted to generate the images of the eye as a function of the information about the detected light received from the light detector 14.

The controller 16 is further adapted to determine and output at least one reaction as a function of the information about the detected light transmitted by the light detector 14. As described above, the reaction may be directed to the artificial eye system 10 and/or the artificial body. If the reaction is directed to the artificial eye system 10, then the control transmits the determined reaction to the artificial eye system 10. In this case, the reaction may correspond to a new image of an eye to be displayed on the see-through display 12, a command indicative of a characteristic for the see-through display 12 or the image displayed on the see-through display 12 such as a brightness value, and/or the like. If the reaction is directed to the artificial body, then the control transmits the determined reaction to the controller of the artificial body. In this case, the reaction may correspond to a command indicative of a movement to be performed by a given part of the artificial body, a command indicative of a sound to be generated by a sound reproduction system or a word or phrase to be pronounced by the sound reproduction system, a command indicative of a physiological reaction to be performed by the artificial body such as an epileptic seizure, or the like.

In one embodiment, the controller 16 comprises at least one physiological model or patient profile stored on a memory and a user of the system 10 may select a given patient profile before using the system 10. The patient profile comprises information about the patient to be simulated. For example, a patient profile may comprise an age, an eye color, a weight, a heart rate, an ethnicity, a medical condition and/or the like for the patient to be simulated. The medical condition information may comprise an identification of a disease, an illness, an injury, any physiologic, mental or psychological condition or disorder, etc. Examples of medical conditions include: coronary heart disease, diabetes, epilepsy, poorly functioning limbs and allergy, strabismus, etc.

Upon selection of a given patient profile by a user, the controller 16 retrieves the information contained in the selected patient profile and uses the retrieved information to generate the image of the eye to be displayed and/or the reaction.

In one embodiment, the reaction may be determined as a function of the variation in time of the information about the detected light. In this case, the controller 16 is adapted to compare the information about the detected light received at a given point in time to the information received at a previous point in time, and determine the reaction as a function of the variation of the information between the two points in time.

In an embodiment in which the artificial eye system 10 comprises at least one photodetector, the information about the detected light comprises at least one value of light intensity. If the artificial eye system 10 comprises a single photodetector, the information transmitted to the controller 16 comprises a single value indicative of the intensity of the light detected by the single photodetector. If more than one photodetector is present in the artificial eye system 10, the information about the detected light may comprise a total light intensity corresponding to the sum of the light intensities detected by all of the photodetectors and/or an average light intensity corresponding to the average or mean of the intensities detected by all of the photodetectors. The information about the detected light may also comprise the light intensity measured by each photodetector in addition to the position of the respective photodetector that measured the light intensity.

In an embodiment in which the artificial eye system 10 comprises a camera, the information about the detected light comprises the image(s) taken by the camera.

In one embodiment, the light detector is adapted to substantially continuously detect light and transmit information about the detected. In another embodiment, the light detector is adapted to iteratively detect light and transmit information about the detected light.

In one embodiment, the reaction is directed to the artificial eye system 10 which may be embedded into an artificial body or not. In this case, the reaction may comprise a change of characteristic for the see-through display 12 such as a new image of the eye to be displayed on the see-through display 12, a new brightness value for the see-through display 12, and/or the like. The controller 16 is then adapted to determine the change of characteristic for the see-through display 12 as a function of the received information about the detected light. For example, the controller 16 may be adapted to determine a new image of the eye to be displayed on the see-through display 12 as a function of the information about the detected light.

In an embodiment in which the light detector 14 is adapted to measure the intensity of the light or part of the light propagating through the see-through display 12, the controller is adapted to determine a reaction for the see-through display 12 as a function of the light intensity measured by the light detector 14. For example, the reaction may be determined as a function of an average light intensity, a total light intensity, a pattern of light intensity, etc. In one embodiment, the light detector 14 may be camera adapted to transmit images of the external environment captures through the see-through display 12. In this case, the controller 16 may be adapted to determine an average light intensity, a total light intensity, a pattern of light intensity, etc. using the received image of the external environment.

For example, the controller 16 may determine a brightness value for the see-through display 12 as a function of the light intensity measured by a photodetector or the total or average light intensity if more than one photodetectors are present in the artificial eye system 10. As a result, the brightness of the see-through display 12 may be decreased if the intensity of the light measured by the photodetector(s) decreases. In another example, the controller 16 may be adapted to determine at least one characteristic for the displayed eye, such as the size, position, shape, color and/or the like of an element forming the displayed eye, as a function of the measured light intensity. For example, the image of the eye may comprise at least one pupil and a sclera, and the controller 16 may be adapted to adjust the size of the pupil as a function of the measured light intensity. In another example, the controller 16 may be adapted to close the displayed eyelids when the measured light intensity is greater than a given threshold.

In an embodiment in which the light detector 14 comprises a camera, the controller 16 is adapted to receive an image of a scene, i.e. an image of the external environment contained within the field of view of the camera. In this case, the controller 16 is adapted to determine a reaction for the see-through display 12 as a function of the image of the scene or information contained in the image of the scene. For example, the controller 16 may be adapted to use object recognition to identify elements contained within the scene such as objects or bodies such as human bodies. The controller 16 may further be adapted to determine at least one characteristic for the identified element(s) such as its position within the scene, its shape, its color, and/or the like. The controller 16 then determines the reaction for the artificial eye display 12, such a new image for the displayed eye or a new brightness value for the displayed image, as a function of the element(s) contained within the scene and/or at least one characteristic of the identified element. For example, the controller 16 may determine the position of the pupil for the displayed eye as a function of the position of a given object identified in the scene so as the displayed eye looks at the given object. The controller 16 then generates a new image of the eye based on the new position for the pupil. In a further example, the controller 16 may be adapted to determine the position of a spot of light within the received image of the scene. The controller 16 then determines a new position of the pupil of the displayed eye as a function of the position of the spot of light and generates a new image of the eye to be displayed based on the newly determined position of the pupil.

As mentioned above, the controller 16 may be adapted to determine the reaction for the artificial eye system 10 as a function of a variation of the information about the detected light. For example, the reaction may be determined as a function of the variation of the light intensity measured by a photodetector. In this case, the controller 16 is adapted to determine an intensity difference between the actual value of the light intensity received from the photodetector and a previous value of the light intensity received from the photodetector. The controller 16 may then determine a new size of the pupil of the displayed eye as a function of the determined intensity difference and generate an image of the eye according to the pupil size. In an embodiment in which the controller 16 is adapted to determine a light pattern using the light intensity measured by a plurality of photodetectors and their respective position, the controller 16 may be adapted to determine a difference or variation between an actual pattern of light and a pattern of light previously received. In this case, the controller 16 may be adapted to determine a new position for the pupil of the displayed eye and generate a new image of the eye according to the determine pupil position. In an embodiment in which the controller 16 receives images of a scene from a camera, the controller 16 may be adapted to determine at least one difference between an actual image of the scene and a previous image of the scene and generate a new image of the eye according to the determined difference. For example, the controller 16 may determine that an object within the scene has moved and determine a new position for the pupil of the displayed eye as a function of the displacement of the object between the previous image and the actual image so that the displayed eye follows the object while moving within the scene. The controller 16 then generates a new image for the displayed eye as a function of the determined new position for the pupil.

In one embodiment, the controller 16 may access a database stored locally or externally which contains at least one respective reaction for each possible information about the detected light or variation of information about the detected light. For example, the database may comprise size values for a pupil each or pupil size variations, each for a respective total or average light intensity detected by photodetectors or a respective variation of total or average light intensity, respectively. In another example, the database may contain positions for the pupil of the displayed eye or position variations for the pupil, each for a respective pattern of light or a respective variation of pattern of light, respectively. In a further example, the database may contain positions for the pupil of the displayed eye or position variations for the pupil, each for a respective position of an object detected in the imaged scene or a respective position variation of an object detected in an imaged scene.

In one embodiment, the reaction is directed to the artificial body. The artificial body may comprise a head, a torso, at least one arm, at least one hand, at least one leg, and/or at least one foot. In one embodiment, at least one of the body parts is articulated and movable. In this case, the artificial body is further provided with a motion control device that is adapted to control the motion of the movable body part(s). In the same or another embodiment, the artificial body comprises a reproduction system that is directed to the reproduction of reactions other than movements. For example, the artificial body may comprise a sound reproduction system/device including at least one speaker to emit sounds and optionally simulate a voice. In another example, the artificial body may comprise a lachrymal gland reproduction system adapted to discharge tears adjacent to the eyes of the artificial body.

In this case, the reaction may comprise a configuration for the artificial body or a part of the artificial body, a configuration variation for the artificial body or a part of the artificial body, a sound, word or sentence to be pronounced by a sound reproduction system contained in the artificial body, a physiological reaction for the artificial body, or the like. A configuration for an artificial body defines the position or relative position of the different movable parts contained in the artificial body. A configuration variation for an artificial body defines a position variation for different movable parts contained in the artificial body. A configuration for a movable part of an artificial body defines a position for the movable part. A configuration variation for a movable part of an artificial body defines a position variation for the movable part. The controller 16 is then adapted to determine the reaction for the artificial body as a function of the received information about the detected light.

It should be understood that any adequate definition for a position variation for a body part may be used. For example, a position variation may be defined as a 3D position vector, a rotation angle, or the like.

In an embodiment in which the light detector 14 is adapted to measure the intensity of the light or part of the light propagating through the see-through display 12, the controller is adapted to determine a reaction for the artificial body as a function of the light intensity measured by the light detector 14. For example, the reaction may be determined as a function of an average light intensity, a total light intensity, a pattern of light intensity, etc. In one embodiment, the light detector 14 may be camera adapted to transmit images of the external environment captures through the see-through display 12. In this case, the controller 16 may be adapted to determine an average light intensity, a total light intensity, a pattern of light intensity, etc. using the received image of the external environment.

For example, the controller 16 may determine a position for the right hand of the artificial body as a function of the light intensity measured by a photodetector contained in the artificial eye system 10. For example, the controller may determine to position the right hand of the artificial body in front of the see-through display 12 if the measured light intensity is greater than a predefined threshold. In another example, the controller 16 may determine a sound to be emitted by a sound reproduction system as a function of the light intensity measured by the photodetector. For example, if the measured light intensity is greater than a predefined threshold, the controller may determine that the sentence "too bright" should be emitted by the sound reproduction system.

In an embodiment in which the light detector 14 comprises a camera, the controller 16 is adapted to receive an image of the scene from the camera. In this case, the controller 16 is adapted to determine a reaction for the artificial body as a function of the image of the scene or information contained in the image of the scene. For example, the controller 16 may be adapted to tract the presence of a person from the images taken by the camera and modifies the displayed image of the eye so that the displayed eye follow the person identified in the images. In another example, after a period of dim light during which a closed eye is displayed, the controller 16 may generate an image of an open eye upon detection of presence of a person.

As mentioned above, the controller 16 may be adapted to determine the reaction for the artificial body as a function of a variation of the information about the detected light. For example, the reaction may be determined as a function of the variation of the light intensity measured by a photodetector. In this case, the controller 16 is adapted to determine an intensity difference between the actual value of the light intensity received from the photodetector and a previous value of the light intensity received from the photodetector. The controller 16 may then determine a rotation angle for the head of the artificial body as a function of the determined intensity difference. In an embodiment in which the controller 16 is adapted to determine a light pattern using the light intensity measured by a camera or by a plurality of photodetectors and their respective position, the controller 16 may be adapted to determine a difference or variation between an actual pattern of light and a pattern of light previously received. In this case, the controller 16 may be adapted to determine a tilt angle for the head of the artificial body. In an embodiment in which the controller 16 receives images of a scene from a camera, the controller 16 may be adapted to determine at least one difference between an actual image of the scene and a previous image of the scene and generate a reaction for the artificial body based on the determined difference between the actual and previous images of the scene.

In one embodiment, the controller 16 may access a database stored locally or externally which contains at least one respective reaction for each possible information about the detected light or variation of information about the detected light. In an embodiment in which the artificial body is provided with a sound reproduction device, the controller 16 accesses a database containing predefined sounds to be emitted by the sound reproduction device for respective detected light information and retrieves the sound that corresponds to the receive detected light information. For example, the database may contain predefined sounds for respective values of total or average light intensities. In another example, the database may contain predefined sounds for respective possible light patterns. For example, the database may comprise sentences to be pronounced, sounds corresponding to cries of pain, sigh of relief, sneeze, etc. or the like. It should be understood that a sound may correspond to a word, a sentence, or the like. For example, the database may contain sounds as a function of the intensity of the detected light. If the intensity is greater than a threshold, the controller 16 may determine that the sentence "too bright" corresponds to the detected light intensity and transmits a command indicative of the determined sentence to the sound reproduction device.

For example, the database may contain sounds as a function of the intensity of the detected light. If the intensity is greater than a threshold, the controller may determine that the sentence "too bright" corresponds to the detected light intensity and outputs a command indicative of the determined sentence. A command indicative of the sentence is then sent to the sound reproduction device.

In another example in which the artificial body comprises a movable head, the database may contain angular positions or rotation angles for the head of the artificial body, each for a respective pattern of light or a respective variation of pattern of light, respectively. In a further example, the database may contain physiological reactions for the artificial body, each for a respective position of an object detected in the imaged scene or a respective position variation of an object detected in an imaged scene. In this case, the controller 16 is adapted to transmit a command indicative of the determined physiological reaction to the controller of the artificial device. In another example, a stroboscopic light may be directed towards the see-through display 12 and the controller 16 may be adapted to determine the rate of the stroboscopic light. If it determines that the rate of the stroboscopic light is greater than a given threshold, the controller 16 determines that the corresponding physiological reaction is an epileptic seizure and outputs a command indicative of the determined epileptic seizure. The controller of the artificial body receives the command from the controller 16 and controls the artificial body to reproduce uncontrolled jerking movement to simulate an epileptic seizure In an embodiment in which the reaction corresponds to a motion for a body part, the controller 14 accesses a database which contains predefined motions for respective detected light information. For example, the database may contain predefined motions for respective values of total or average light intensities. In another example, the database may contain predefined motions for respective possible light patterns. In an embodiment in which the artificial body comprises more than one movable body part, the database further comprise an identification of the body part to be moved in addition to an identification of the movement to be performed. It should be understood that any adequate definition of a movement can be used. For example, a movement may be defined as type of movement such as a rotation, an extension, a contraction, a vibration or the like, and optionally a movement range such as a range of degrees. An exemplary movement may comprise a rotation of the head by 90 degrees. It should be understood that the movement range may also be defined by a final position for the body part.

In one embodiment, the controller 16 may further determine the reaction as a function of information contained in a patient profile. For example, if the patient profile indicates that the simulated patient is epileptic and is the detected light corresponds to a stroboscopic light, the controller 16 may determine the reaction to be an epileptic seizure.

When the determined reaction corresponds to a new image of the eye to be displayed, it should be understood that the controller 16 may determine the new image of the eye as a function of the detected light and also as a function of the information contained on the patient profile, if any. For example, if the patient profile indicates that the simulated patient suffers from strabismus, the controller 16 will generate an image of the eye taking into account the identified strabismus.

Figure 2:
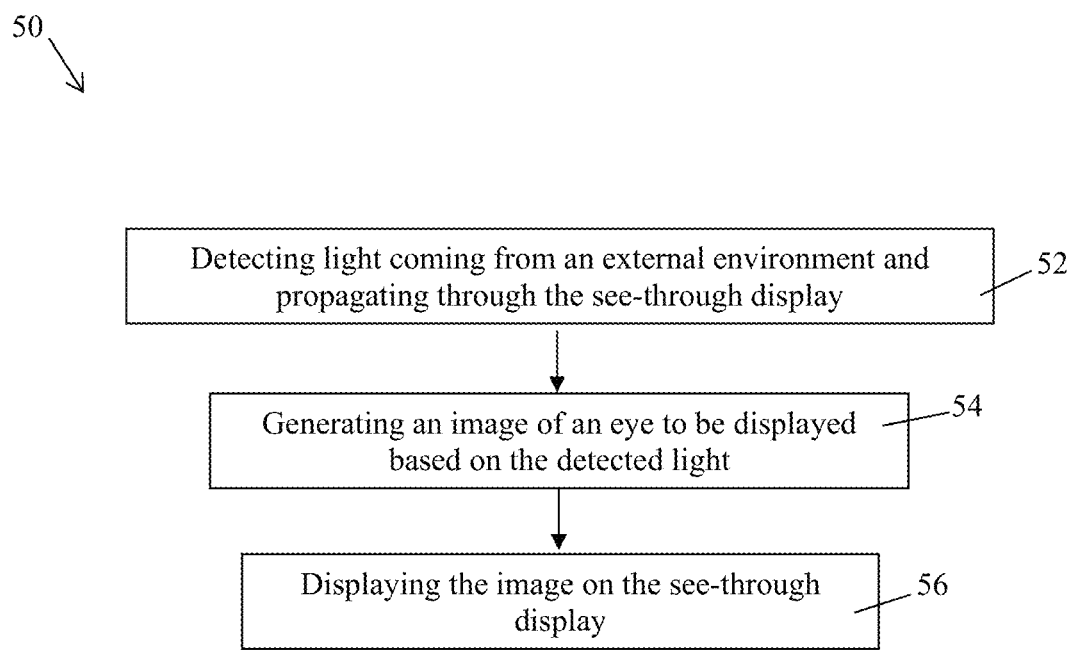
FIG. 2 is flow chart of a method for displaying an image of an eye on a display unit, in accordance with an embodiment.

FIG. 2 illustrates one embodiment of a method 50 for displaying an image of an eye on a see-through display contained in an artificial eye system such as artificial eye system 10.

At step 52, at least a portion of the light coming from an environment external to the artificial eye system is detected by a light detector. As described above, the light detector is positioned behind the see-through display.

At step 54, at least one characteristic for an image of an eye to be displayed is determined as a function of the detected light. As described above, at least one characteristic for the image of the eye is determined as a function of the detected light or at least one characteristic or parameter of the detected light. For example, the brightness of the image of the eye, the size, shape, position, and/or color of at least one element forming the eye, or the like may be determined as a function of the intensity of the detected light, a pattern of light determined form the detected light, an image of the external environment, elements contained within the image of the external environment, or the like. As described above, the characteristic for the eye may be determined based on a variation of the detected light. In this case, the method 50 further comprises a step of determining the variation of the detected light, such as a variation of intensity, a difference between two images, etc. Once the characteristic for the image of the eye has been determined, an image of the eye is generated using the determined characteristic.

At step 56, the generated image of the eye is displayed on the see-through display.

Figure 3:
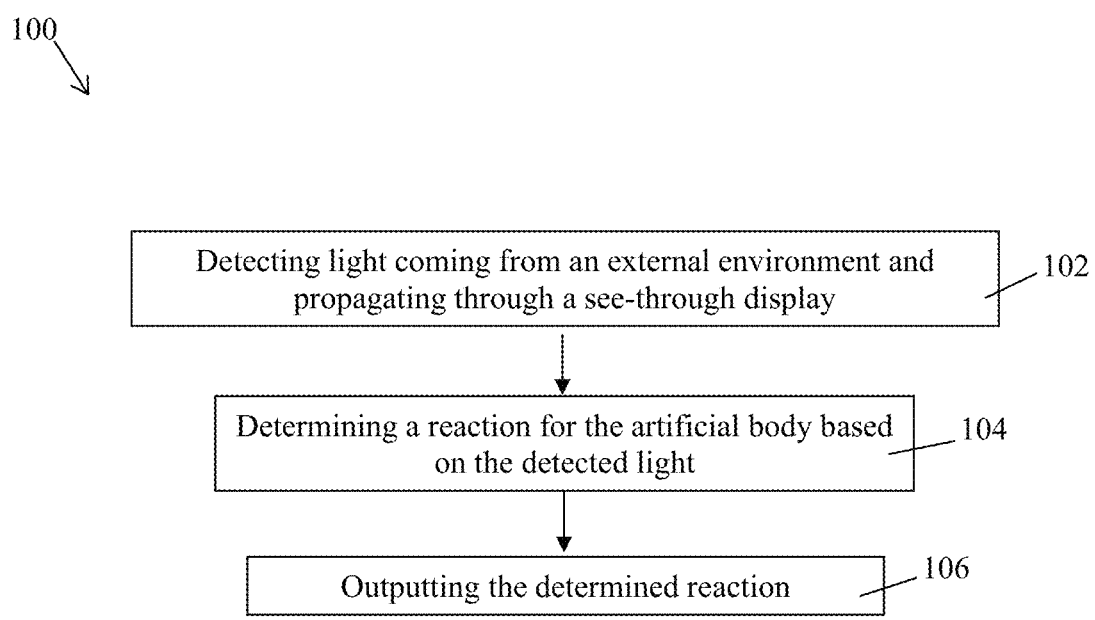
FIG. 3 is flow chart of a method for controlling an artificial body, in accordance with an embodiment.

FIG. 3 illustrates one embodiment of a method 100 for controlling an artificial body using an artificial eye system such as artificial eye system 10. The artificial eye system comprises a see-through display, a light detector and a controller as described above.

At step 102, at least a portion of the light coming from an environment external to the artificial eye system is detected by a light detector. As described above, the light detector is positioned behind the see-through display.

At step 104, a reaction for the artificial body is determined as a function of the detected light. As described above, the reaction may be a new configuration for the artificial body or a body part, a sound to be emitted by a sound production device contained in the artificial body, a physiological reaction to be reproduced by the artificial body, etc.

As described above, the reaction may be determined based on a variation of the detected light. In this case, the method 100 further comprises a step of determining the variation of the detected light, such as a variation of intensity, a difference between two images, etc.

At step 106, the determined reaction is outputted. For example, the reaction may be transmitted to a motion controller that controls the movable part(s) of the artificial body, the sound reproduction device, a lachrymal gland reproduction device, etc.

It should be understood that the artificial body may comprise a head, a torso, at least one arm, at least one hand, at least one leg, and/or at least one foot, and at least one of the body parts is articulated and movable and controlled by a motion controller. In the same or another embodiment, the artificial body may comprise a sound reproduction device for emitting sounds and/or a lachrymal gland reproduction device for discharging tears.

It should be understood that the above-described artificial eye system 10 may be embedded in a body part such as a head or in a body such as a patient simulator, a robot, a toy or the like. It should also be understood that an artificial body may comprise more than one artificial eye system 10.

Figure 4:
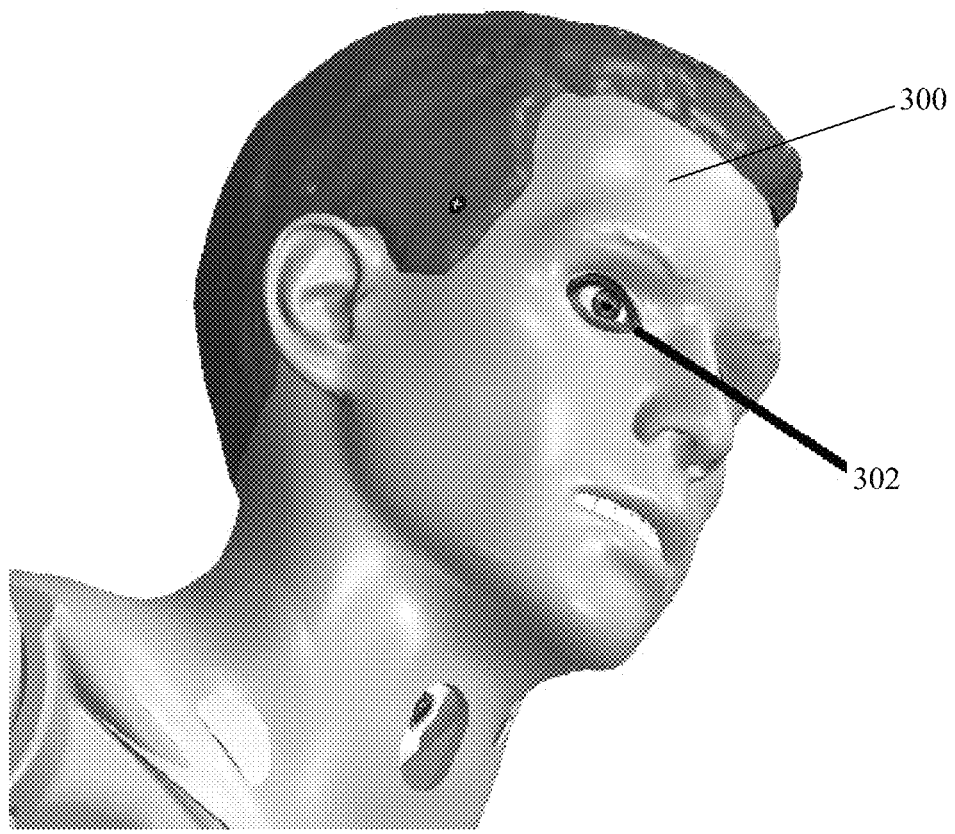
FIG. 4 a head of a patient simulator provided with an artificial eye system including two see-through displays, in accordance with an embodiment.

For example, FIG. 4 illustrates one embodiment of a patient simulator 300 that may be used to train medical staff. The patient simulator 300 is provided an artificial eye system which comprises with two see-though displays 302 each for displaying a respective image of an eye thereon. The artificial eye system further comprises two light detectors each located behind a respective see-through display 302 and at least one controller (not shown) to determine a reaction for the artificial eye system and/or the artificial body.

The artificial eye system may comprise a single controller for determining the reaction. Alternatively, each see-through display 302 may be associated with a respective controller. In this case, each controller may generate reactions independently of the other.

FIG. 5, 6a-6c and 7a-7c illustrate one embodiment of the operation of a controller configured to move the pupils of a patient simulator according to the displacement of a beam of light incident on one eye of the patient simulator n, i.e. on one of the see-through display of the patient simulator.

Figure 5:
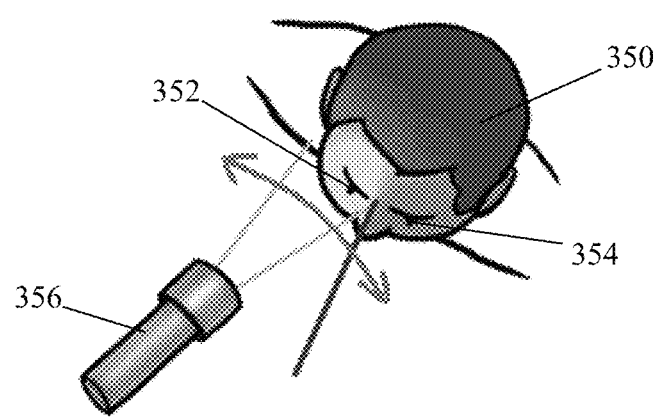
FIG. 5 illustrates the propagation of a light beam towards a right eye of a patient simulator, in accordance with an embodiment.

As illustrated in FIG. 5, a patient simulator 350 is provided with two artificial eyes 352 and 354 which each comprise a see-through display on which an image of an eye is displayed. A light source 356 emits a light beam towards the eye 352 and the light source 356 is rotated or moved so that the light beam sweeps the eye 352 from the right of the eye 352 to the left thereof. Each eye 353, 354 comprises a see-through display and a camera located behind its respective see-through display.

Figures 6A, 6B, 6C:
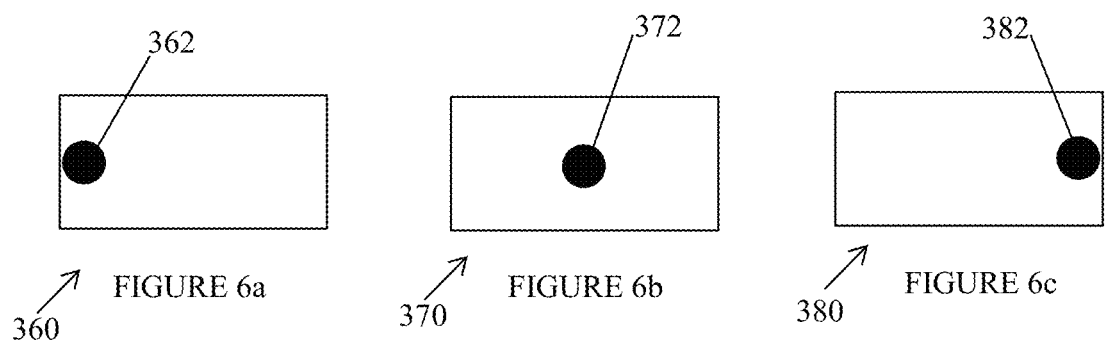
FIGS. 6a-6c each illustrates a pattern of detected light, in accordance with an embodiment.

FIGS. 6a-6c illustrate three images 360, 370 and 380 taken by the camera of the eye 352 at three different times during the sweeping of the light beam.

Figures 7A, 7B, 7C:
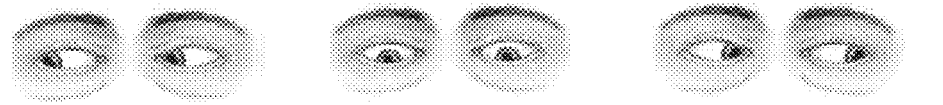
FIGS. 7a-7c each illustrates a respective eye configuration for each one of the patterns of detected light of FIGS. 6a-6c, in accordance with an embodiment.

FIG. 6a illustrates an image 360 taken by the camera 352 at the beginning of the swiping of the light beam when the light beam is directed towards the left of the eye 352. The image comprises a dot 362 that corresponds to the spot of the light beam on the camera. The dot 362 is located on the left of the image 360. As a result and as illustrated in FIG. 7a, the controller generates an image of the eyes 352 and 354 as a function of the location of the dot 362, i.e. an image of an eye in which the pupil is located at the left of the eye 352, 354.

FIG. 6b illustrates an image 370 taken by the camera 352 during the swiping of the light beam when the light beam is directed towards the center of the eye 352. The image comprises a dot 372 that corresponds to the spot of the light beam on the camera. The dot 372 is located at the center of the image 360. As a result and as illustrated in FIG. 7b, the controller generates an image of the eyes 352 and 354 as a function of the location of the dot 372, i.e. an image of an eye in which the pupil is located at the center of the eye 352, 354.

FIG. 6c illustrates an image 380 taken by the camera 352 at the end of the swiping of the light beam when the light beam is directed towards the right of the eye 352. The image comprises a dot 382 that corresponds to the spot of the light beam on the camera. The dot 382 is located on the right of the image 380. As a result and as illustrated in FIG. 7c, the controller generates an image of the eyes 352 and 354 as a function of the location of the dot 382, i.e. an image of an eye in which the pupil is located at the right of the eye 352, 354.

In one embodiment, the controller may be adapted to calculate the displacement of the light spot on the display unit from one measure to another and predict the path of the light beam using the calculated displacement. The controller may then use the predicted path to determine the next position for the light spot and the next position of the pupil.

It should be understood that the controller 10 may determine more than one reaction for a detected light. For example, if it determines that the intensity of the detected light is greater than a given threshold, the controller may determine that the eyes must be closed while the head of the artificial body is rotated away from the light and the sound production device pronounces the sentence "too bright".

In one embodiment, the artificial eye system 10 is further provided with a light sensor adapted to measure the wavelength of the light incident thereon. In this case, the controller receives the wavelength or range of wavelength detected by the light sensor and generates the image of the eye to be displayed on the display unit as a function of the light detected by the first group of light cells and also as a function of the measured wavelength. In one embodiment, the light sensor is embedded into the display unit. In another embodiment, the light detector 12 may be adapted to determine the wavelength or range of wavelength of the light incident thereon.

In one embodiment, the controller 16 is adapted to estimate the intensity of the light that reaches the light detector 12 and comes from the see-through display 14 while displaying an image of an eye, and subtract this estimated intensity from the intensity of the light detected by the light detector 12.

In an embodiment in which the light detector 12 comprises a camera positioned behind the see-through display 16, the controller 16 may be adapted to only consider the portion of the image that is detected by the camera pixels that are located behind the pupil of the displayed eye. Since the pupil is usually black, the display pixels used for simulating the pupil do not emit light. As a result, the camera pixels located behind the pupil detect less light emitted by the see-through display 12.

In one embodiment, the artificial eye system 10 may be embodied in a mask to be worn by a standardized patient for training medical staff.

In one embodiment, the above-described methods may be each embodied as a system comprising is a processing module for executing the steps of the method 10, a memory and at least one communication bus for interconnecting these components. The processing module typically includes one or more Computer Processing Units (CPUs) and/or Graphic Processing Units (GPUs) for executing modules or programs and/or instructions stored in memory and thereby performing processing operations. The communication buses optionally include circuitry (sometimes called a chipset) that interconnects and controls communications between system components. The memory includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory optionally includes one or more storage devices remotely located from the CPU(s). The memory, or alternately the non-volatile memory device(s) within the memory, comprises a non-transitory computer readable storage medium. In some embodiments, the memory, or the computer readable storage medium of the memory stores at least the following program, module, and data structure, or a subset thereof:

a reaction or image determining module for determining a reaction and/or an image of an eye to be displayed;

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory may store a subset of the modules and data structures identified above. Furthermore, the memory may store additional modules and data structures not described above.

Each of the above-described method may be embodied as a computer program product comprising a computer readable memory storing computer executable instructions thereon that when executed by a computer perform the step of the method.

The embodiments of the invention described above are intended to be exemplary only. The scope of the invention is therefore intended to be limited solely by the scope of the appended claims.

We claim:

1. An artificial eye system comprising:
    a see-through display comprising a screen made of one of a transparent material and a semi-transparent material, the see-through display being configured for displaying an image of an eye on the one of a transparent material and a semi-transparent material of the screen;
    a light detector for detecting light incident on the one of a transparent material and a semi-transparent material and propagating therethrough from an external environment; and
    a controller for:
    processing the detected light to determine a displacement of an element within a scene contained in the external environment;
    generating the image of the eye using information about the light detected by the light detector, the image of the eye comprising at least a pupil and a sclera, the pupil being positioned within the image as a function of the determined displacement; and
    providing the generated image of the eye comprising the at least the pupil and the sclera for display on the see-through display.

2. The artificial eye system of claim 1, wherein the controller is further adapted to determine the image of the eye as a function of a patient profile, the patient profile comprising at least one of an age, an eye color, a weight, a heart rate, an ethnicity and a medical condition.

3. The artificial eye system of claim 1, wherein the light detector comprises at least one light sensor each adapted to measure an intensity of light incident thereon.

4. The artificial eye system of claim 1, wherein the light detector comprises a camera for imaging the scene contained in the external environment and seen through the screen.

5. The artificial eye system of claim 4, wherein the detected light comprises at least one image of the scene acquired by the camera.

6. The artificial eye system of claim 1, wherein the controller is adapted to generate the image of the eye as a function of one of an intensity of the detected light and an intensity variation of the detected light.

7. The artificial eye system of claim 6, wherein the intensity comprises one of a peak intensity, a total intensity and an average intensity.

8. The artificial eye system of claim 6, wherein the intensity comprises a pattern of detected light.

9. The artificial eye system of claim 1, wherein the controller is adapted to determine at least one characteristic for at least one element to be contained in the image of the eye as a function of the detected light.

10. The artificial eye system of claim 9, wherein the at least one characteristic comprises at least one of a shape, a color, a size and a position for the at least one element.

11. A method for displaying an eye on a see-through display, the method comprising:
    detecting light propagating through the see-through display from an external environment, the see-through display comprising a screen made of one of a transparent material and a semi-transparent material, the detected light being incident on the one of a transparent material and a semi-transparent material and propagating therethrough;
    processing the detected light to determine a displacement of an element within a scene contained in the external environment;
    generating an image of the eye using information about the light detected by the light detector, the image of the eye comprising at least a pupil and a sclera, the pupil being positioned within the image as a function of the determined displacement; and
    displaying the generated image of the eye comprising the at least the pupil and the sclera on the one of a transparent material and a semi-transparent material of the screen.

12. The method of claim 11, wherein said generating the image of the eye is further performed as a function of a patient profile, the patient profile comprising at least one of an age, an eye color, a weight, a heart rate, an ethnicity and a medical condition.

13. The method of claim 11, wherein said generating the image of the eye to be displayed is performed as a function of one of an intensity of the detected light and an intensity variation of the detected light.

14. The method of claim 13, wherein the intensity comprises one of a peak intensity, a total intensity and an average intensity.

15. The method of claim 13, wherein the intensity comprises a pattern of detected light.

16. The method of claim 11, wherein said detecting the light comprises acquiring an image of the scene contained in the external environment and seen through the screen.

17. The method of claim 11, wherein said generating the image comprises determining at least one characteristic for at least one element to be contained in the image of the eye as a function of the detected light.

18. The method of claim 17, wherein the at least one characteristic comprises at least one of a shape, a color, a size and a position for the at least one element.

19. A simulator comprising:
- a manikin comprising at least a head;
- a see-through display mountable to the head of the manikin, the see-through display comprising a screen made of one of a transparent material and a semi-transparent material, the see-through display being configured for displaying an image of an eye on the one of a transparent material and a semi-transparent material of the screen;
- a light detector mountable to the head of the manikin, the light detector being configured for detecting light incident on the one of a transparent material and a semi-transparent material and propagating therethrough from an external environment; and
- a controller for:
- processing the detected light to determine a displacement of an element within a scene contained in the external environment;
- generating the image of the eye using information about the light detected by the light detector, the image of the eye comprising at least a pupil and a sclera, the pupil being positioned within the image as a function of the determined displacement; and
- providing the generated image of the eye comprising the at least the pupil and the sclera for display on the see-through display.

20. The simulator of claim 19, wherein the light detector comprises at least one light sensor each adapted to measure an intensity of light incident thereon.

* * * * *